(12) United States Patent
Harada (10) Patent No.: US 11,479,090 B2
(45) Date of Patent: Oct. 25, 2022

(54) SPEAKER SYSTEM AND VEHICLE DOOR (71) Applicant: YAMAHA Corporation, Hamamatsu (JP)

(72) Inventor: Hideki Harada, Hamamatsu (JP)

(73) Assignee: YAMAHA CORPORATION, Shizuoka (JP)

(*) Notice: Subject to any disclaimer, the term of this patent is extended or adjusted under 35 U.S.C. 154(b) by 73 days.

(21) Appl. No.: 17/072,955

(22) PCT Filed: Apr. 17, 2018

(86) PCT No.: PCT/JP2018/015852
§ 371 (c)(1),
(2) Date: Oct. 16, 2020

(87) PCT Pub. No.: WO2019/202656
PCT Pub. Date: Oct. 24, 2019

(65) Prior Publication Data
US 2021/0354535 A1 Nov. 18, 2021

(51) Int. Cl.
B60J 5/04 (2006.01)
B60R 11/02 (2006.01)
(Continued)

(52) U.S. Cl.
CPC .......... B60J 5/0416 (2013.01); B60J 5/0413 (2013.01); B60J 5/0418 (2013.01); B60J 5/0468 (2013.01);
(Continued)

(58) Field of Classification Search
CPC ...... B60J 5/0416; B60J 5/0413; B60J 5/0418; B60J 5/0468; B60R 11/0217; H04R 1/02
(Continued)

(56) References Cited

U.S. PATENT DOCUMENTS 10,495,123 B2* 12/2019 Bartenbach ............. F16B 19/02
2012/0027222 A1* 2/2012 Kirsch ................ B60R 11/0217
381/86
(Continued)

FOREIGN PATENT DOCUMENTS

| JP | 2005039454 A | 2/2005 |
|---|---|---|
| JP | 2009137416 A | 6/2009 |
| WO | 2005049352 A1 | 6/2005 |

OTHER PUBLICATIONS

Notice of Reasons for Refusal in JP 2020-514822 dated Dec. 21, 2021.

Primary Examiner — Joseph D. Pape
(74) Attorney, Agent, or Firm — Chip Law Group (57) ABSTRACT Disclosed is a speaker system including a first panel that is an outer plate of a vehicle door, a second panel disposed on a vehicle interior side of the vehicle door, a third panel disposed between the first panel and the second panel, a speaker unit that has a sound emitting surface for emitting a sound toward the vehicle interior and is mounted on the second panel or the third panel, a first coupling mechanism that couples a peripheral portion of the second panel to the third panel, and a second coupling mechanism disposed at a position nearer the center of the second panel than a position of the speaker unit in the plane of the second panel and configured to couple the second panel and the third panel in the plane at a position not overlapping with the speaker unit.

9 Claims, 9 Drawing Sheets (51) Int. Cl.
 *B60R 13/02* (2006.01)
 *B60R 11/00* (2006.01)
(52) U.S. Cl.
 CPC ....... *B60R 11/0217* (2013.01); *B60R 13/0243* (2013.01); *B60R 2011/0021* (2013.01)
(58) Field of Classification Search
 USPC .................................................. 296/146.7
 See application file for complete search history.

(56) References Cited

U.S. PATENT DOCUMENTS

2013/0076060 A1\* 3/2013 Nakashima ............. B60R 21/04
 296/146.7
2014/0259952 A1\* 9/2014 Sheehy .................. B60J 5/0418
 49/475.1

\* cited by examiner

SPEAKER SYSTEM AND VEHICLE DOOR

CROSS REFERENCE TO RELATED APPLICATIONS

This application is a continuation of International Patent Application No. PCT/JP2018/015852 filed Apr. 17, 2018. Each of the above-referenced applications is hereby incorporated herein by reference in its entirety.

BACKGROUND

The present disclosure relates to a speaker system and a vehicle door including a speaker system.

In some cases, a vehicle door includes an outer panel, a door trim disposed on a vehicle interior side, and an inner panel disposed between the outer panel and the door trim. Door functional parts, such as a speaker unit and a window regulator, are attached to the inner panel. As described, for example, in Japanese Patent Laid-open No. 2009-137416, a module carrier plate on which the door functional parts are mounted is attached so as to cover an opening in the inner panel.

SUMMARY

In a speaker system in the related art that is equipped with the speaker unit disposed inside the vehicle door as described above, there arises a problem in which an operation of the speaker unit transmits the vibration of its diaphragm to the door trim and thus causes the door trim to suffer unnecessary vibration. This is likely to result in the generation of sounds other than the sounds that are originally to be generated by a speaker.

In view of the above circumstances, it is desirable to provide a speaker system and a vehicle door that are capable of reducing a sound that is generated by the vibration of a door trim.

According to a mode of the present disclosure, there is provided a speaker system including a first panel, a second panel, a third panel, a speaker unit, a first coupling mechanism, and a second coupling mechanism. The first panel is an outer plate of a vehicle door. The second panel is disposed on a vehicle interior side of the vehicle door. The third panel is disposed between the first panel and the second panel. The speaker unit has a sound emitting surface for emitting a sound toward a vehicle interior and is mounted on the second panel or the third panel. The first coupling mechanism couples a peripheral portion of the second panel to the third panel. The second coupling mechanism is disposed at a position nearer the center of the second panel than a position of the speaker unit in the plane of the second panel and is configured to couple the second panel and the third panel in the plane at a position not overlapping with the speaker unit.

According to another mode of the present disclosure, there is provided a vehicle door including the above-described speaker system.

DETAILED DESCRIPTION OF THE PREFERRED EMBODIMENTS

1. First Embodiment

A first embodiment of the present disclosure will now be described with reference to the accompanying drawings. It should be noted that the dimensions and scales of various parts depicted in the drawings are made different, as appropriate, from actual ones. Further, the embodiments described below are preferred embodiments of the present disclosure. Therefore, various technically preferred limitations are imposed on the embodiments described below. However, the scope of the present disclosure is not limited to the embodiments described below as far as the description given below does not include a particular statement of limitations imposed on the present disclosure.

Figure 1:
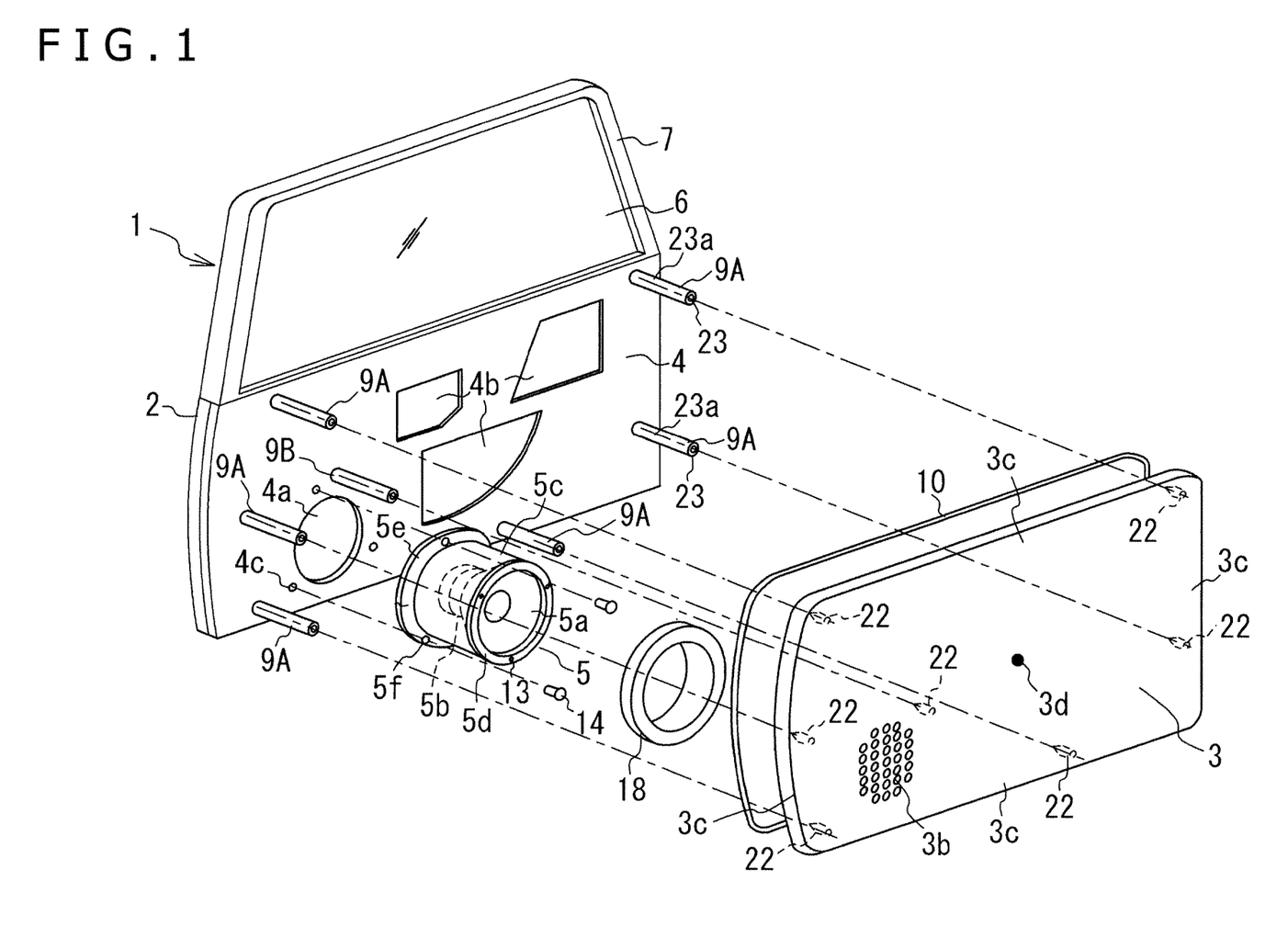
FIG. 1 is an exploded perspective view of a vehicle door including a speaker system according to a first embodiment of the present disclosure.
Figure 2:
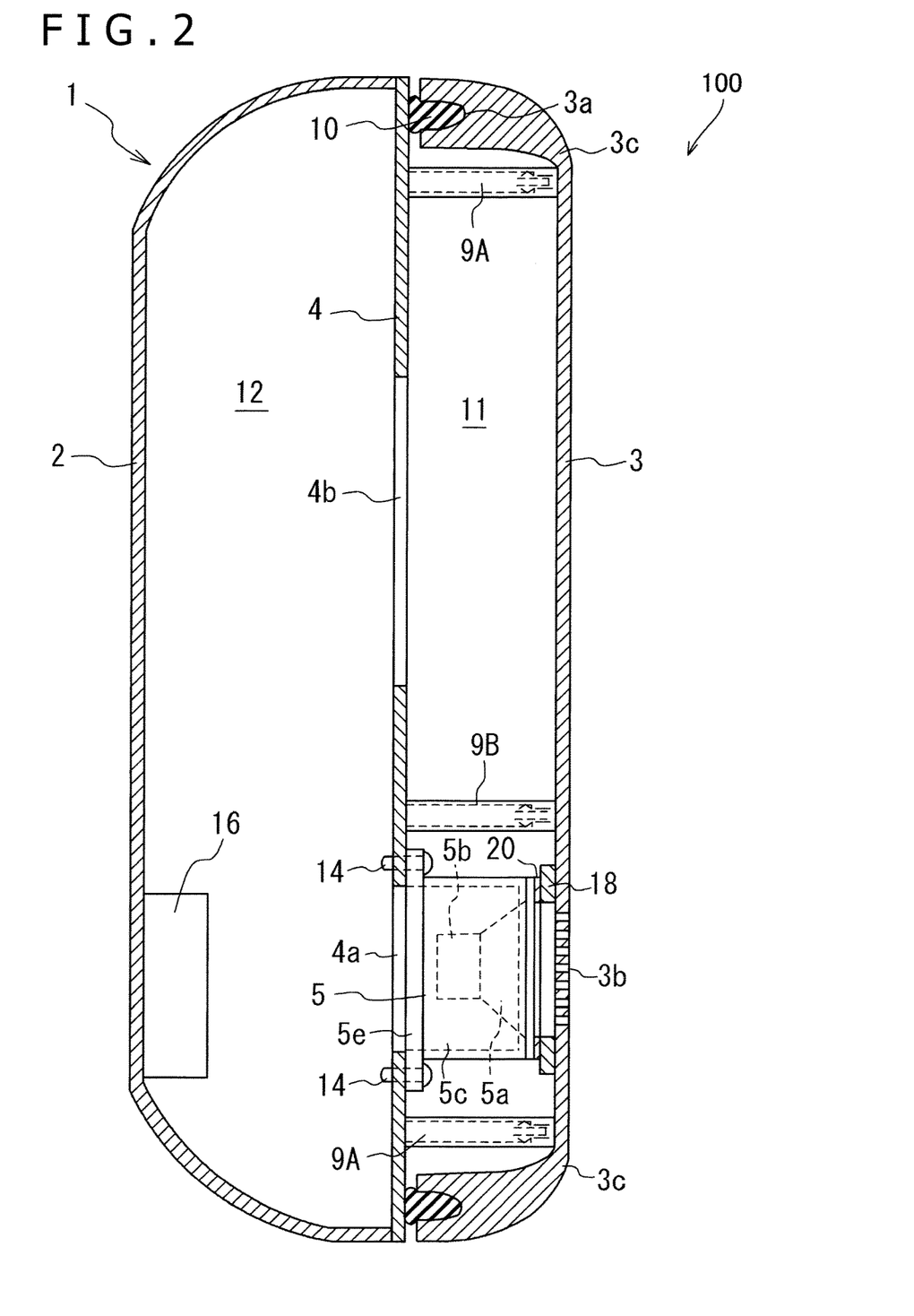
FIG. 2 is a longitudinal sectional view of the speaker system.
Figure 3:
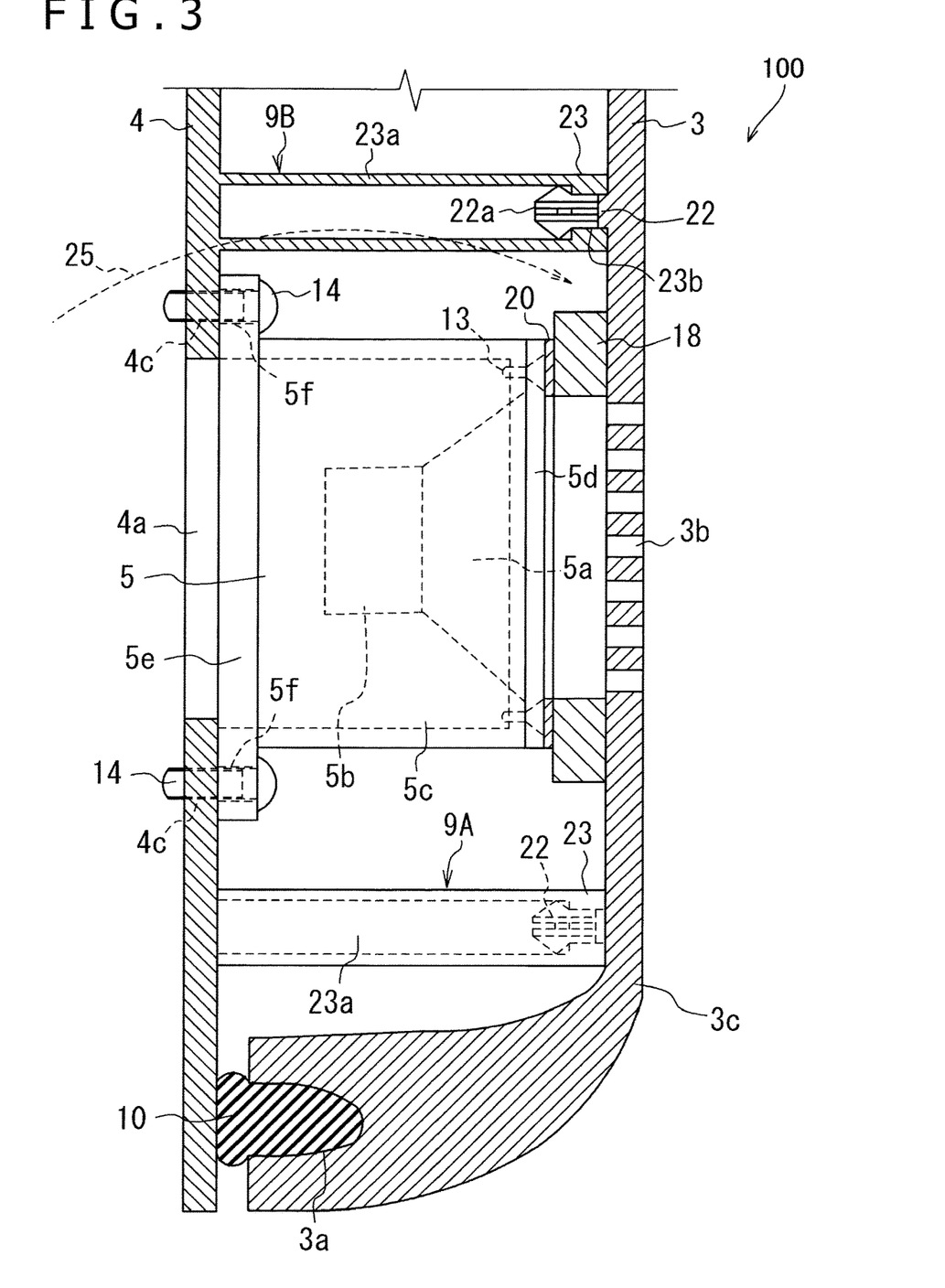
FIG. 3 is a partially enlarged sectional view of FIG. 2.

FIG. 1 is an exploded perspective view illustrating a configuration of a speaker system and vehicle door according to the first embodiment. FIG. 2 is a longitudinal sectional view illustrating the first embodiment. FIG. 3 is a partially enlarged view of FIG. 2. A speaker system 100 includes a speaker unit 5 and an enclosure. In the present embodiment, a vehicle door 1 functions as an enclosure.

The vehicle door 1 includes a first panel 2 and a second panel 3. The first panel 2 is an outer plate (outer panel) positioned outside a vehicle. The second panel 3 is disposed as an interior finishing material for a vehicle interior side of the vehicle door 1 and is referred to as a door trim. Further, the vehicle door 1 includes a third panel 4. The third panel 4 is disposed between the first panel 2 and the second panel 3 and is referred to as an inner panel. A speaker unit 5 is incorporated in the vehicle door 1. The speaker unit 5 has a sound emitting surface 5a for emitting a sound toward a vehicle interior and is mounted on the third panel 4. The sound emitting surface 5a is the inner wall surface of a frustoconical diaphragm.

A steel plate is typically used for the first panel 2 and the third panel 4. The first panel 2 and the third panel 4 are coupled together. For example, an aluminum alloy or a carbon material may be used for the first panel 2 and the third panel 4. For example, a synthetic resin molded plate is used for the second panel 3. A frame body 7 is disposed on the top of the first panel 2 and third panel 4. A windowpane 6 is vertically movably housed in the frame body 7.

An opening 4a and a plurality of openings 4b are formed in the third panel 4 in order to house the speaker unit 5. Undepicted parts for vertically moving the windowpane 6, such as a motor and a door lock actuator, can be housed in the openings 4b. In the present embodiment, at least some of the openings 4b are covered neither by various parts nor by dedicated members for covering the openings 4b.

The second panel 3 is fastened to the third panel 4 by a plurality of first coupling mechanisms 9A and a second coupling mechanism 9B. These coupling mechanisms 9A and 9B will be described in detail later. A groove-shaped packing mount 3a is disposed along the outer rim of the second panel 3. A packing 10 is inserted into the packing mount 3a. As the packing 10 is placed between the second panel 3 and the third panel 4, a space 11 enclosed by the second panel 3 and the third panel 4 remains airtight. At least some openings 4b formed in the third panel 4 allow the space 11 to communicate with a space 12 enclosed by the first panel 2 and the third panel 4.

The speaker unit 5 in the present example includes a speaker main body 5b and a housing 5c. The speaker main body 5b includes, for example, a voice coil, a magnet, and a diaphragm. The housing 5c is cylindrically shaped to house the speaker main body 5b. The speaker main body 5b has a brim 5d on the side toward the second panel 3. When the brim 5d is fastened to the housing 5c with screws 13, the housing 5c is secured to the speaker main body 5b.

The housing 5c has an opening on the side toward the third panel 4. The outer periphery of the housing 5c has a brim 5e on the side toward the third panel 4. The brim 5e has mounting holes 5f for mounting the speaker unit 5. The speaker unit 5 is mounted on the third panel 4 when mounting screws 14 are inserted through the mounting holes 5f and screwed into screw holes 4c in the third panel 4. Alternatively, the speaker unit 5 may be fastened to the third panel 4 by making through-holes instead of the screw holes 4c in the third panel 4, inserting the mounting screws 14 through the through-holes, and securing the mounting screws 14 with nuts.

A plurality of openings 3b are formed in an area of the second panel 3 that faces the sound emitting surface 5a of the speaker unit 5. The openings 3b are used so that a sound generated by the speaker unit 5 is emitted into the vehicle interior. A sound absorbing material 16 is disposed on the surface of the first panel 2 that faces the rear surface of the speaker unit 5 (the surface opposite the sound emitting surface). The sound absorbing material 16 absorbs the sound generated by the speaker unit 5 so as to reduce standing waves.

An elastic body 18 is attached to the surface of the speaker unit 5 that is positioned toward the second panel 3, namely, the periphery on the side toward the sound emitting surface 5a. The elastic body 18 is shaped like a ring to cover the gap between the speaker unit 5 and the second panel 3. For example, an elastic material, such as elastic rubber, or an elastic synthetic resin foam material may be used for the elastic body 18. The elastic body 18 in the present example is attached with an adhesive 20 to the periphery of the sound emitting surface 5a of the speaker unit 5. In a state where the second panel 3 is fastened to the third panel 4 with the elastic body 18 attached to the speaker unit 5, the elastic body 18 is sandwiched between the speaker unit 5 and the second panel 3. This covers the gap between the speaker unit 5 and the second panel 3. The sound emitting openings 3b formed in the second panel 3 are positioned in an area enclosed by the elastic body 18 when planarly viewed from the vehicle interior along the central axis of the speaker unit 5.

Figure 4:
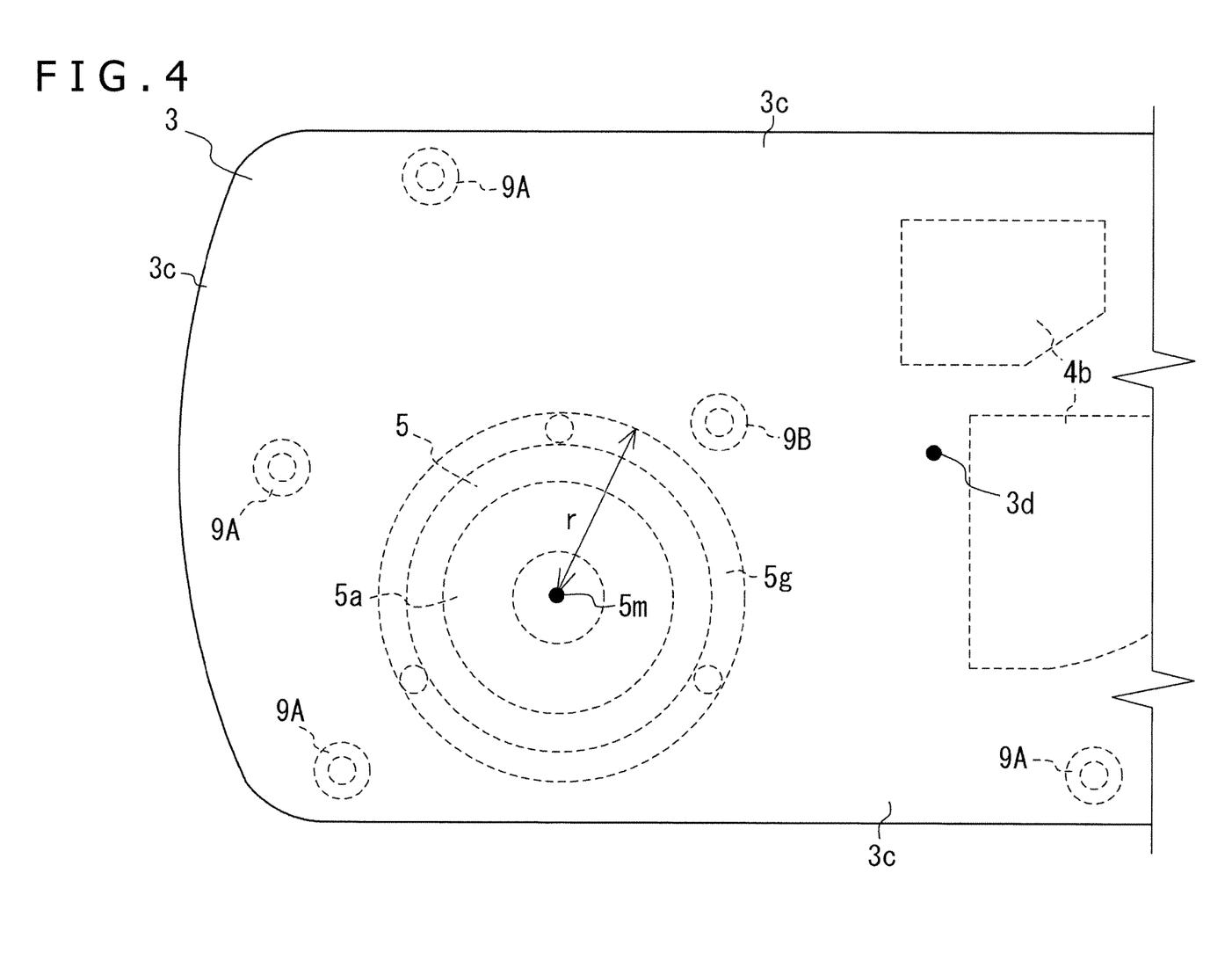
FIG. 4 is a view, as viewed from a vehicle interior side, of an example of a second panel (door trim) on which a speaker unit is mounted.

As depicted in FIGS. 1, 2, and 4, the first coupling mechanisms 9A, which fasten the second panel 3 to the third panel 4, fasten the second panel 3 to the third panel 4 at a plurality of points on the periphery 3c of the second panel 3. In the subsequent description, as planarly viewed from the vehicle interior along the central axis of the speaker unit 5, the center of gravity of the second panel 3 is referred to as a center 3d of the second panel 3.

The second coupling mechanism 9B is disposed at a position nearer the center 3d of the second panel 3 than a position of the speaker unit 5 in the plane of the second panel 3 and is positioned so as not to overlap with the speaker unit 5 in the plane.

More specifically, the second coupling mechanism 9B is positioned in such a manner that the shortest distance between the second coupling mechanism 9B and the end of the second panel 3 is longer than the shortest distance between the second panel 3 and each of the first coupling mechanisms 9A, and is positioned near the outer periphery of the speaker unit 5. In the present embodiment, however, as the speaker unit 5 is covered with the housing 5c, the second coupling mechanism 9B for coupling the second panel 3 and the third panel 4 is positioned near the outer periphery 5g of the housing 5c.

Further, in the present example, as depicted in FIG. 4, the sound emitting surface 5a is circular in shape when planarly viewed from the vehicle interior along the central axis of the speaker unit 5. Additionally, it is assumed that, as planarly viewed, the distance between the center position of the second coupling mechanism 9B and the center of the sound emitting surface 5a is not greater than three times the radius r of the sound emitting surface 5a. However, in the plane of the second panel 3, the second coupling mechanism 9B is positioned so as not to overlap with the speaker unit 5. If the distance between the center position of the second coupling mechanism 9B and the center of the sound emitting surface 5a is greater than three times the radius r of the sound emitting surface 5a, it is difficult to reduce the vibration of the second panel 3 that is generated near the outer periphery of the sound emitting surface 5a. It should be noted that a plurality of second coupling mechanisms 9B may be disposed instead of the single second coupling mechanism 9B depending on the mounting position of the speaker unit 5.

The second coupling mechanism 9B in the present example has the same structure as that of the first coupling mechanisms 9A. More specifically, as depicted in FIG. 3, the coupling mechanisms 9A and 9B each include an insert 22 and a receiver 23. The insert 22 is disposed on the second panel 3. The receiver 23 is disposed on the third panel 4.

The insert 22 in the present example is formed integrally with the second panel 3. The receiver 23 is formed on the tip of a cylindrical rod-shaped portion 23a formed integrally with the third panel 4 and is provided with an insertion hole 23b into which the insert 22 is to be pushed. The insert 22 is an elastic body. When the second panel 3 is to be coupled to the third panel 4, a tip portion 22a of the insert 22 disposed on the second panel 3 is pushed into the insertion hole 23b. In a process of pushing the insert 22 into the insertion hole 23b, the tip portion 22a of the insert 22 experiences diameter reduction when passing through the insertion hole 23b and then recovers its original diameter after passing through the insertion hole 23b. The insert 22 is fastened to and retained by the receiver 23. As a result, the second panel 3 is secured to the third panel 4.

In addition, when the second panel 3 is pulled toward the vehicle interior with a strong force in relation to the third panel 4, the tip portion 22a of the insert 22 experiences diameter reduction and passes through the insertion hole 23b. This makes it possible to pull the insert 22 out of the insertion hole 23b. Consequently, the second panel 3 can be separated from the third panel 4.

As described above, in a case where the second panel 3 is to be fastened to the third panel 4, not only the periphery 3c of the second panel 3 is fastened to the third panel 4 with the first coupling mechanisms 9A, but also the second panel 3 is fastened to the third panel 4 with the second coupling mechanism 9B at a position nearer the center 3d of the second panel 3 than a position of the speaker unit 5 in the plane of the second panel 3.

When the second coupling mechanism 9B is used to fasten the third panel 4 to a portion of the second panel 3 that is positioned near the outer periphery 5g of the speaker unit 5, the vibration of the second panel 3 is reduced or prevented. Stated differently, a portion of the second panel 3 that is easily vibrated by an operation of the speaker unit 5 is a portion of the second panel 3 that is not secured by the first coupling mechanisms 9A, namely, a portion apart from the periphery 3c of the second panel 3. When the second coupling mechanism 9B is used to secure a portion apart from the periphery 3c and near the outer periphery 5g of the speaker unit 5 that is easily affected by the vibration of the speaker unit 5, the vibration of the second panel 3 is reduced or prevented.

When the vibration of the second panel 3 is reduced or prevented as described above by the second coupling mechanism 9b, the generation of sounds other than the sounds that are originally to be generated by the speaker unit 5 is prevented to improve the sound quality of sounds generated from the speaker unit 5.

Further, as the elastic body 18 is disposed in the present embodiment, the elastic body 18 sandwiched between the speaker unit 5 and the second panel 3 elastically deforms to tolerate a positioning error of the speaker unit 5. This makes it easy to install the speaker unit 5. Furthermore, sounds emitted from the rear surface of the speaker unit 5 are restrained or prevented from propagating toward the sound emitting surface 5a of the speaker unit 5 as indicated by a broken line 25 in FIG. 3. Therefore, the sound quality of a forward radiated sound originally generated from the sound emitting surface 5a of the speaker unit 5 can be restrained or prevented from being degraded under the influence of a backward radiated sound propagating from the rear surface of the speaker unit 5. As a result, a sound that is to be originally generated from the sound emitting surface 5a of the speaker unit 5 can easily be obtained to improve the sound quality.

In the present embodiment, the space 12 formed between the first panel 2 and the third panel 4 and the space 11 formed between the second panel 3 and the third panel 4 communicate with each other through the openings 4b. The cubic volume of the enclosure of the speaker unit 5 is equal to the sum of the cubic volume of the space 11 and the cubic volume of the space 12. Therefore, the cabinet volume of a speaker system is larger than that of a speaker system in the related art that uses only the space 12 as the enclosure. This makes it possible to lower the lowest resonance frequency and raise the reproduction sound pressure in a low pitch range. However, the present disclosure is also applicable to a configuration where the space 11 and the space 12 are separated from each other.

It should be noted that the openings 4b in the third panel 4 may be covered, for example, with a synthetic resin film. Such a film has a sufficiently low transmission loss in the low pitch range. Therefore, even in a case where such a film is used, the space enclosed by the first panel 2 and the second panel 3 functions as an integrated enclosure particularly in the low pitch range.

Figure 5:
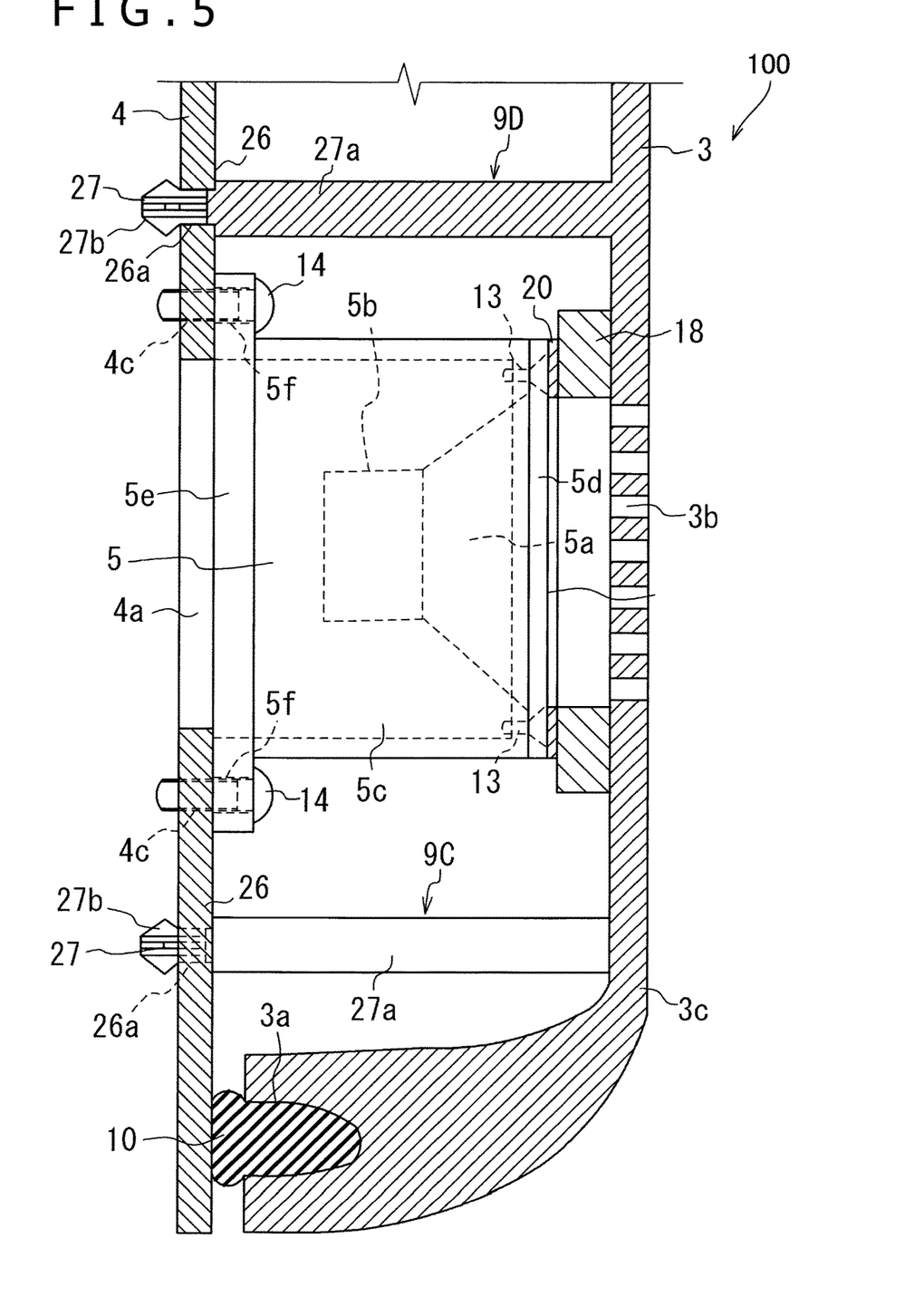
FIG. 5 is a longitudinal sectional view of another example of a coupling mechanism in the speaker system according to the first embodiment of the present disclosure.
Figure 6:
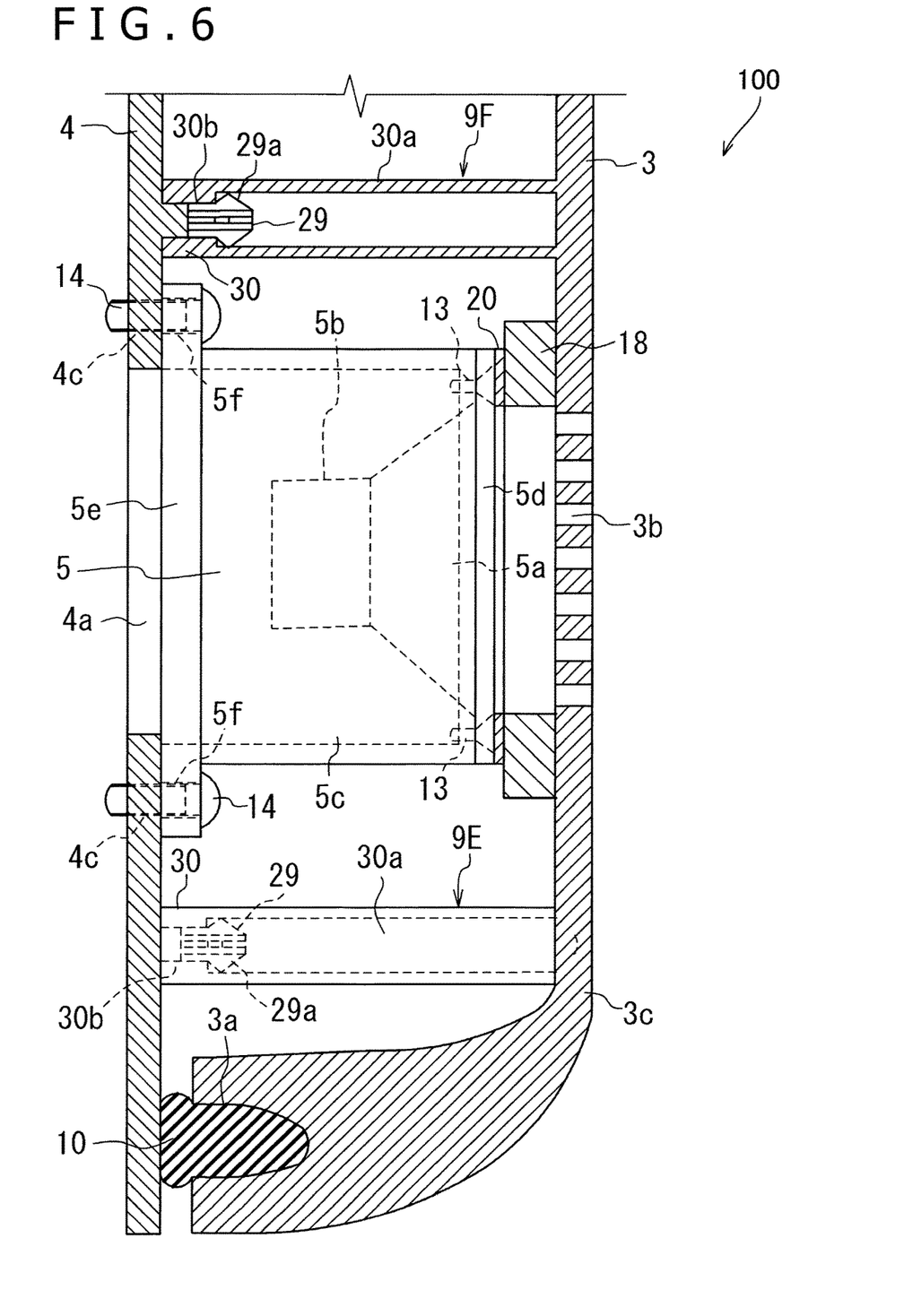
FIG. 6 is a longitudinal sectional view of another example of the coupling mechanism in the speaker system according to the first embodiment of the present disclosure.
Figure 7:
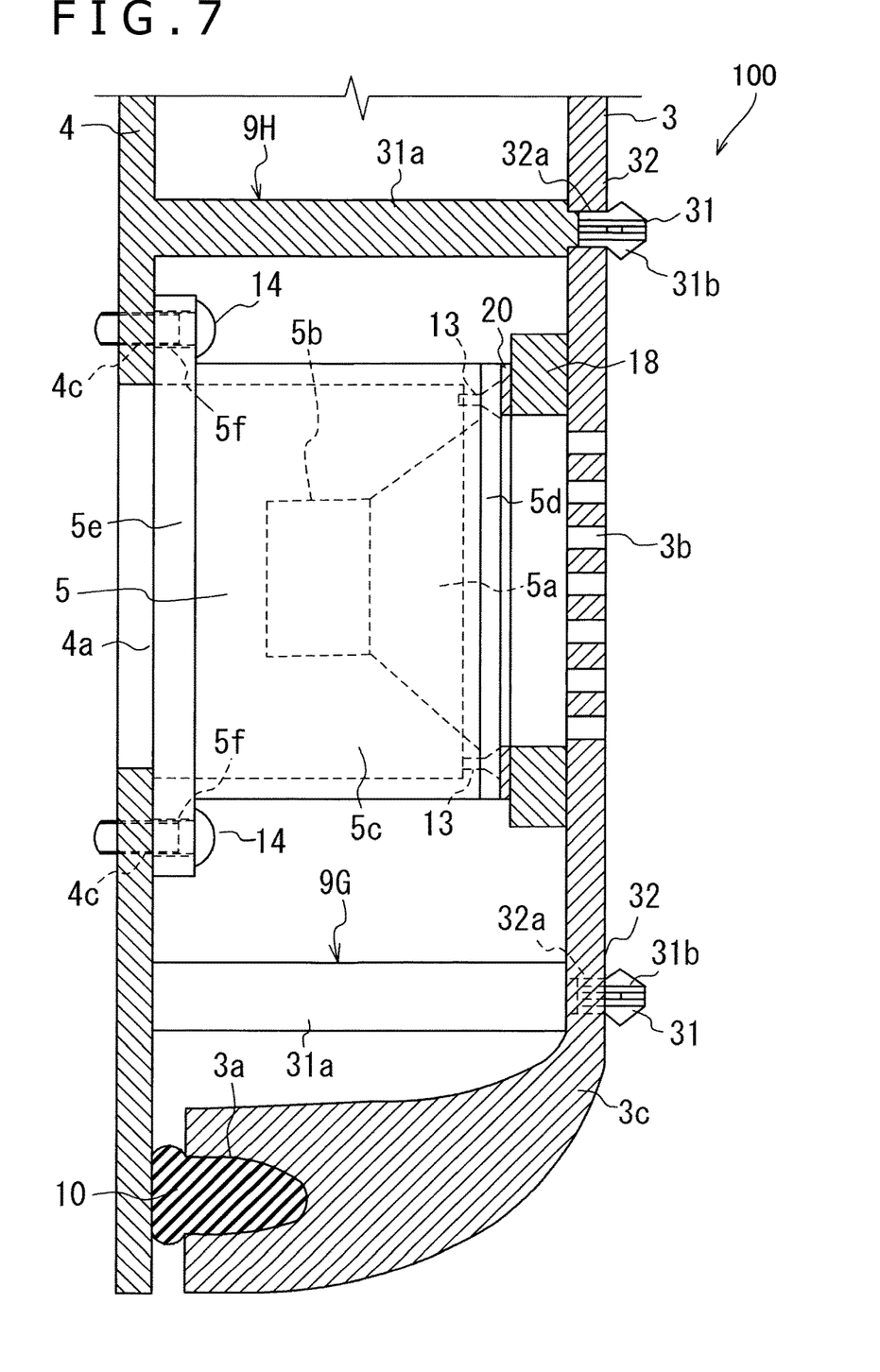
FIG. 7 is a longitudinal sectional view of another example of the coupling mechanism in the speaker system according to the first embodiment of the present disclosure.

FIGS. 5 to 7 respectively illustrate other examples of the first and second coupling mechanisms. In the example of FIG. 5, a receiver 26 of a first coupling mechanism 9C and second coupling mechanism 9D is disposed as an insertion hole 26a directly formed in the third panel 4. Further, an insert 27 is an elastic body. The insert 27 is disposed on the tip of a rod-shaped portion 27a formed integrally with the second panel 3. In the present example, when a tip portion 27b of the insert 27 is inserted into the insertion hole 26a in the third panel 4 and secured, the second panel 3 is fastened to the third panel 4.

In the example of FIG. 6, an insert 29 of a first coupling mechanism 9E and second coupling mechanism 9F is integrally disposed on the third panel 4, and a receiver 30 is disposed on the tip of a cylindrical rod-shaped portion 30a disposed on the second panel 3. The insert 29 is an elastic body. The receiver 30 has an insertion hole 30b into which a tip portion 29a of the insert 29 is inserted and secured. In the present example, when the tip portion 29a of the insert 29 is inserted into the insertion hole 30b in the receiver 30 and secured, the second panel 3 is fastened to the third panel 4.

In the example of FIG. 7, an insert 31 of a first coupling mechanism 9G and second coupling mechanism 9H is disposed on the tip of a rod-shaped portion 31a disposed integrally with the third panel 4. The insert 31 is an elastic body. A receiver 32 is disposed as an insertion hole 32a directly formed on the second panel 3. In the present example, when a tip portion 31b of the insert 31 is inserted into the insertion hole 32a in the receiver 32 and secured, the second panel 3 is fastened to the third panel 4.

It should be note that, in the examples of FIGS. 3, 5, 6, and 7, the lengths of the rod-shaped portions 23a, 27a, 30a, and 31a are equivalent to the width between the second panel 3 and the third panel 4. Alternatively, the lengths may be less than the width between the second panel 3 and the third panel 4. In a case where the lengths of the rod-shaped portions 23a, 27a, 30a, and 31a are to be decreased, an alternative structure may be employed so that a pair of inserts or receivers also includes a rod-shaped portion compensating for such a decrease.

Further, the rod-shaped portions 23a, 27a, 30a, and 31a or inserts 22, 27, 29, and 31 depicted in FIGS. 3, 5, 6, and 7 are not required to be formed integrally with the third panel 4 or the second panel 3. An alternative structure may be employed so that one end is inserted into a hole bored in the third panel 4 or the second panel 3 and then secured, for example, by bonding or welding.

Moreover, as depicted in FIGS. 5 and 7, the receivers 26 and 32 are disposed as the insertion holes 26a and 32a directly formed in the third panel 4 or the second panel 3. In this case, the receivers 26 and 32 may be made thicker than a surrounding panel board in order to increase the strength of the receivers 26 and 32. Furthermore, as an alternative to configuring an insert as a single item, the insert may be configured to include a first member and a second member. The first member is to be inserted into an insertion hole and secured, and the second member is to be inserted into the first member for reinforcement purposes.

Figure 8:
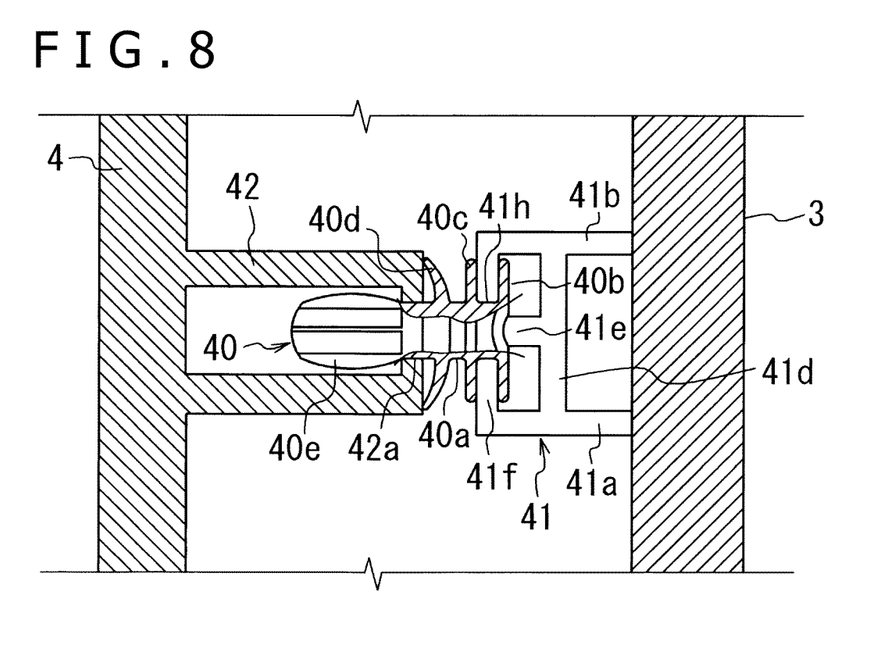
FIG. 8 is a longitudinal sectional view of another example of the coupling mechanism in the speaker system according to the first embodiment of the present disclosure.
Figure 9:
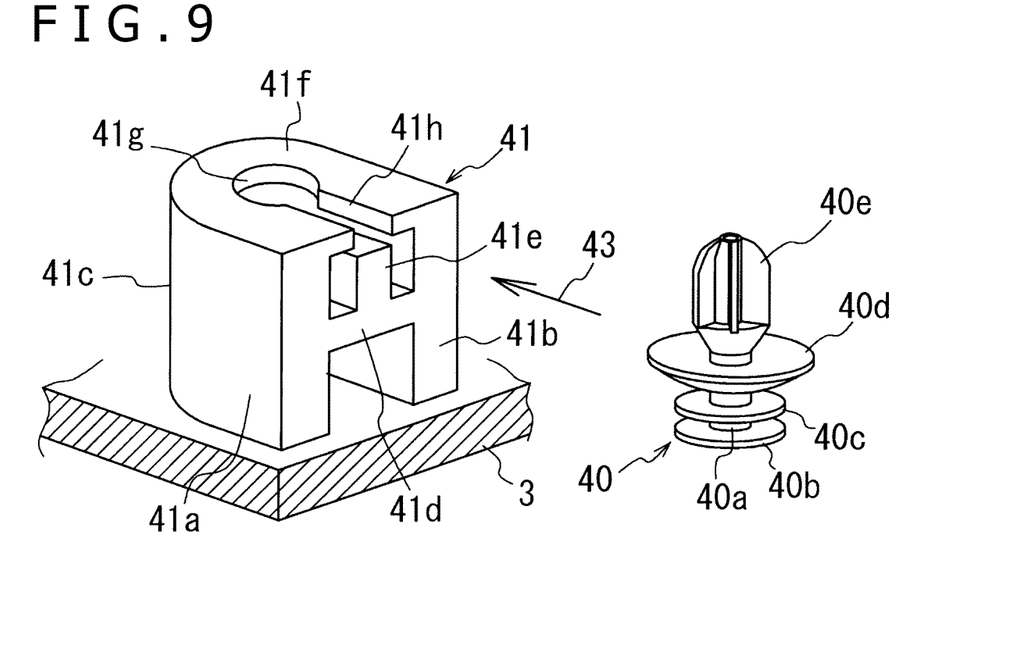
FIG. 9 is an exploded perspective view illustrating an uncoupled part of the coupling mechanism depicted in FIG. 8.

FIGS. 8 and 9 illustrate another example of the first and second coupling mechanisms. In this example, a mounting part 41 for mounting an insert 40 is disposed integrally with the second panel 3 made of synthetic resin, and a receiver 42 is disposed integrally with the third panel 4. The mounting part 41 is structured so that a semi-cylindrical part 41c is used to couple one end of a side plate 41a integrally with one end of a side plate 41b opposing the side plate 41a. A parallel plate part 41d and a vertical plate part 41e are included between the side plates 41a and 41b. The parallel plate part 41d is parallel to the second panel 3. The vertical plate part 41e is disposed on the parallel plate part 41d in order to support the insert. A top plate part 41f is disposed on the tip portions of the side plates 41a and 41b and semi-cylindrical part 41c. The top plate part 41f has a circular mounting hole 41g and an insert lead-in groove 41h. The insert lead-in groove 41h is for introducing the insert 40 into the mounting hole 41g from the space between the side plates 41a and 41b.

The insert 40 includes a plurality of brims 40b, 40c, and 40d and a tip portion 40e. The brims 40b and 40c are formed integrally around a shaft 40a and are spaced apart from each other. The brim 40d comes into contact with the tip surface of the insert receiver 42. The tip portion 40e is elastically deformable. The tip portion 40e is formed to have a larger outside diameter than the shaft 40a. As depicted in FIG. 9, when the shaft 40a of the insert 40 is pushed inward from the aperture plane between the side plates 41a and 41b of the mounting part 41 as indicated by an arrow 43 through the lead-in groove 41h of the mounting part 41, the insert 40 is mounted in the mounting part 41. In this instance, as depicted in FIG. 8, the top plate part 41f is pushed inward while being sandwiched between the brims 40b and 40c of the insert 40. The shaft 40a is then inserted into the mounting hole 41g.

The receiver 42 disposed on the third panel 4 is cylindrical in shape, and an insertion hole 42a is formed in the tip of the receiver 42. The insert 40 is to be inserted into the insertion hole 42a. The insertion hole 42a has a smaller inside diameter than the cylindrically shaped receiver 42.

When the second panel 3 is to be fastened to the third panel 4, the insert 40 should be mounted in the mounting part 41 disposed on the second panel 3, and then, the tip portion 40e of the insert 40 should be pushed inward from the insertion hole 42a in the receiver 42. When pushed inward, the tip portion 40e of the insert 40 is elastically deformed to experience diameter reduction and pass through the insertion hole 42a. When the tip portion 40e recovers its original diameter after passing through the insertion hole 42a, the insert 40 is fastened to the receiver 42. As a result, the second panel 3 is secured to the third panel 4.

2. Second Embodiment

Figure 10:
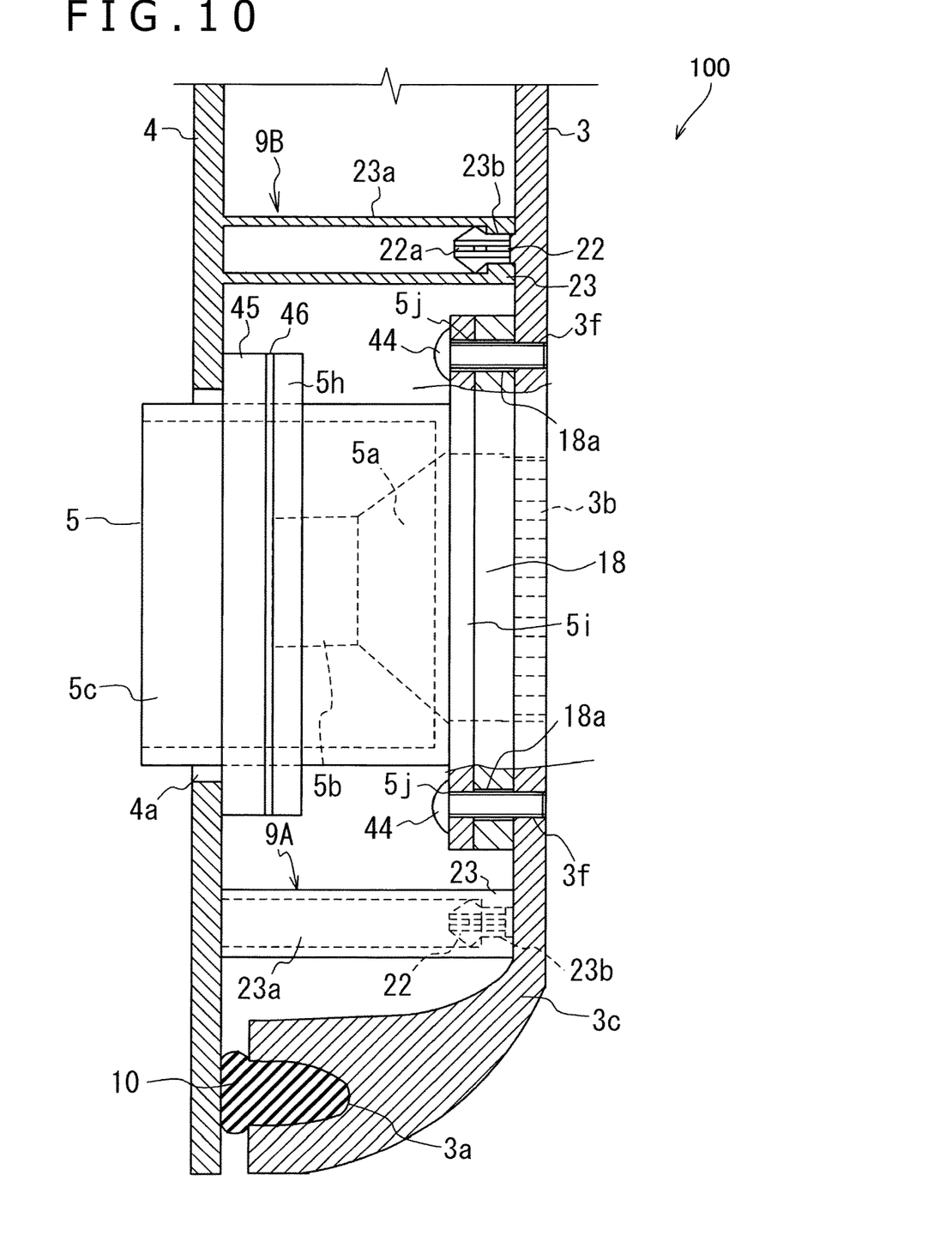
FIG. 10 is a longitudinal sectional view of the speaker system according to a second embodiment of the present disclosure.

FIG. 10 illustrates the speaker system 100 according to a second embodiment of the present disclosure. The present embodiment is configured such that the speaker unit 5 is mounted on the second panel 3. In the present embodiment, a mounting brim 5i is formed on a side of the speaker unit 5 that is positioned toward the second panel 3. The brim 5i has a mounting hole 5j. When a mounting screw 44 is inserted through the hole 5j, further inserted through a hole 18a formed in the elastic body 18, and screwed into a screw hole 3f formed in the second panel 3, the speaker unit 5 is mounted on the second panel 3.

Further, in the present embodiment, a brim 5h is formed on the housing 5c of the speaker unit 5, and an elastic body 45 is placed over the brim 5h and then secured to the brim 5h. In the present example, the elastic body 45 is secured to the brim 5h via an adhesive 46. Alternatively, the elastic body 45 may be secured to the brim 5h by using screws or other fasteners. In a state where the second panel 3 is fastened to the third panel 4, the elastic body 45 restrains or prevents sounds emitted toward the rear surface of the speaker unit 5 from leaking out of the housing 5c.

In the present embodiment, the speaker unit 5 is mounted on the second panel 3. As the speaker unit 5 is mounted on the second panel 3 in advance, the present embodiment is advantageous in terms of assembly such that the speaker system 100 can easily be configured by merely mounting the second panel 3 on the third panel 4.

Modifications

The foregoing embodiments may variously be modified. Two or more modes appropriately selected from the following examples may suitably be combined unless they conflict with one another.

(1) The first coupling mechanisms 9A and the second coupling mechanism 9B, which fasten the second panel 3 to the third panel 4, are not required to have the same structure; they may have different structures.

(2) The first coupling mechanisms 9A and the second coupling mechanism 9B, which fasten the second panel 3 to the third panel 4, are not required to be structured so that the receivers and the inserts engage with each other. An alternative structure may be employed so that mounting screws inserted through holes in either one of the second and third panels are screwed into screw holes or nuts disposed on the other one.

Modes Understood from at Least One of Embodiments and Modifications

The following modes are understood from at least one of the foregoing embodiments and modifications.

There is provided a speaker system including a first panel, a second panel, a third panel, a speaker unit, a first coupling mechanism, and a second coupling mechanism. The first panel is an outer plate of a vehicle door. The second panel is disposed on a vehicle interior side of the vehicle door. The third panel is disposed between the first panel and the second panel. The speaker unit has a sound emitting surface for emitting a sound toward the vehicle interior and is mounted on the second panel or the third panel. The first coupling mechanism couples a peripheral portion of the second panel to the third panel. The second coupling mechanism is disposed at a position nearer the center of the second panel than a position of the speaker unit in the plane of the second panel and is configured to couple the second panel and the third panel in the plane at a position not overlapping with the speaker unit. According to the above-described mode, the second coupling mechanism effectively reduces or prevents the vibration of the second panel. Therefore, the generation of unnecessary sounds that are originally not to be generated by the speaker unit is prevented to improve the sound quality of sounds generated from the speaker unit.

As a mode of the above-described speaker system, it is preferable, as planarly viewed from the vehicle interior along the central axis of the speaker unit, that the sound emitting surface be circularly shaped and that the distance between the second coupling mechanism and the center of the sound emitting surface be not greater than three times the radius of the sound emitting surface. According to this mode, when positioned at a distance not greater than three times the radius of the sound emitting surface from the sound emitting surface, the second coupling mechanism is able to effectively provide the effect of reducing the vibration of the second panel.

As a mode of the above-described speaker system, it is preferable that the first coupling mechanism and the second coupling mechanism each include an insert and a receiver. The insert is disposed on the second panel. The receiver is disposed on the third panel and provided with an insertion hole into which the insert is to be inserted. According to this mode, the second panel can easily be attached to and detached from the third panel without any screws or other fasteners for securing the second panel to the third panel.

As a mode of the above-described speaker system, it is preferable that at least either one of the first and second coupling mechanisms includes the receiver disposed on the tip of a rod-shaped portion formed on the third panel. According to this mode, the second panel can easily be attached to and detached from the third panel without any screws or other fasteners for securing the second panel to the third panel. Further, the rod-shaped portion makes it easy to create a space between the second panel and the third panel.

As a mode of the above-described speaker system, it is preferable that at least either one of the first and second coupling mechanisms includes the insert disposed on the tip of a rod-shaped portion formed on the second panel. According to this mode, the second panel can easily be attached to and detached from the third panel without any screws or other fasteners for securing the second panel to the third panel. Further, the rod-shaped portion makes it easy to create a space between the second panel and the third panel.

As a mode of the above-described speaker system, it is preferable that the first coupling mechanism and the second coupling mechanism each include the insert disposed on the third panel and the receiver disposed on the second panel and provided with an insertion hole into which the insert is to be inserted. According to this mode, the second panel can easily be attached to and detached from the third panel without any screws or other fasteners for securing the second panel to the third panel.

As a mode of the above-described speaker system, it is preferable that at least either one of the first and second coupling mechanisms includes the receiver disposed on the tip of a rod-shaped portion formed on the second panel. According to this mode, the second panel can easily be attached to and detached from the third panel without any screws or other fasteners for securing the second panel to the third panel. Further, the rod-shaped portion makes it easy to create a space between the second panel and the third panel.

As a mode of the above-described speaker system, it is preferable that at least either one of the first and second coupling mechanisms includes the insert disposed on the tip of a rod-shaped portion formed on the third panel. According to this mode, the second panel can easily be attached to and detached from the third panel without any screws or other fasteners for securing the second panel to the third panel. Further, the rod-shaped portion makes it easy to create a space between the second panel and the third panel.

As a mode of the above-described speaker system, it is preferable that an elastic body be included and sandwiched between the third panel side surface of the second panel and the second panel side surface of the speaker unit. According to this mode, the elastic body elastically deforms to tolerate a positioning error of the speaker unit. This makes it easy to achieve the positioning of the speaker unit. Further, sounds emitted from the rear surface of the speaker unit are restrained or prevented from propagating toward the sound emitting surface of the speaker unit. Therefore, the sound quality of a forward radiated sound originally generated from the sound emitting surface of the speaker unit can be restrained or prevented from being degraded under the influence of a backward radiated sound propagating from the rear surface of the speaker unit. As a result, a sound that is originally to be generated from the sound emitting surface of the speaker unit can easily be obtained to improve the sound quality.

As a mode of the above-described vehicle door, it is preferable that one of the above-described speaker systems be included. According to this mode, the above-described effects can be obtained.

It should be understood by those skilled in the art that various modifications, combinations, sub-combinations and alterations may occur depending on design requirements and other factors insofar as they are within the scope of the appended claims or the equivalent thereof.

What is claimed is:

1. A speaker system, comprising:
a first panel that is an outer plate of a vehicle door;
a second panel on a vehicle interior side of the vehicle door;
a third panel between the first panel and the second panel;
a speaker unit on one of the second panel or the third panel, wherein
the speaker unit includes a sound emitting surface,
the sound emitting surface is configured to emit a sound toward a vehicle interior, and
the sound emitting surface has a circular shape as planarly viewed from the vehicle interior along a central axis of the speaker unit;
a first coupling mechanism configured to couple a peripheral portion of the second panel to the third panel; and
a second coupling mechanism at a position nearer a center of the second panel than a position of the speaker unit in a plane of the second panel, wherein
the second coupling mechanism is configured to couple the second panel and the third panel in the plane at a position not overlapping with the speaker unit, and
a distance between a center position of the second coupling mechanism and a center of the sound emitting surface, as planarly viewed from the vehicle interior along the central axis of the speaker unit, is not greater than three times a radius of the sound emitting surface.

2. The speaker system according to claim 1, wherein each of the first coupling mechanism and the second coupling mechanism includes:
an insert on the second panel; and
a receiver on the third panel, wherein the receiver includes an insertion hole into which the insert is to be inserted.

3. The speaker system according to claim 2, wherein at least one of the first coupling mechanism or the second coupling mechanism includes the receiver on a tip of a rod-shaped portion on the third panel.

4. The speaker system according to claim 2, wherein at least one of the first coupling mechanism or the second coupling mechanism includes the insert on a tip of a rod-shaped portion on the second panel.

5. The speaker system according to claim 1, wherein each of the first coupling mechanism and the second coupling mechanism includes:
an insert on the third panel; and
a receiver on the second panel, wherein the receiver includes an insertion hole into which the insert is to be inserted.

6. The speaker system according to claim 5, wherein at least one of the first coupling mechanism or the second coupling mechanism includes the receiver on a tip of a rod-shaped portion on the second panel.

7. The speaker system according to claim 5, wherein at least one of the first coupling mechanism or the second coupling mechanism includes the insert on a tip of a rod-shaped portion on the third panel.

8. The speaker system according to claim 1, further comprising an elastic body, wherein
- the elastic body is between a first surface of the second panel and a second surface of the speaker unit,
- the first surface is on a third panel side of the second panel, and
- the second surface is on a second panel side of the speaker unit.

9. A vehicle door, comprising:
- a speaker system including:
  - a first panel that is an outer plate of the vehicle door;
  - a second panel on a vehicle interior side of the vehicle door;
  - a third panel between the first panel and the second panel;
  - a speaker unit on one of the second panel or the third panel, wherein
    - the speaker unit includes a sound emitting surface,
    - the sound emitting surface is configured to emit a sound toward a vehicle interior, and
    - the sound emitting surface has a circular shape as planarly viewed from the vehicle interior along a central axis of the speaker unit;
  - a first coupling mechanism configured to couple a peripheral portion of the second panel to the third panel; and
  - a second coupling mechanism at a position nearer a center of the second panel than a position of the speaker unit in a plane of the second panel, wherein
    - the second coupling mechanism is configured to couple the second panel and the third panel in the plane at a position not overlapping with the speaker unit, and
  - a distance between a center position of the second coupling mechanism and a center of the sound emitting surface, as planarly viewed from the vehicle interior along the central axis of the speaker unit, is not greater than three times a radius of the sound emitting surface.

* * * * *